(12) United States Patent
Vaynberg et al.

(10) Patent No.: US 10,303,842 B2
(45) Date of Patent: May 28, 2019

(54) DEVICE FOR SENSORIAL EVALUATION OF CONSUMER PRODUCT APPLICATION FEEL

(71) Applicant: Hercules Incorporated, Wilmington, DE (US)

(72) Inventors: Konstantin Abraham Vaynberg, Cherry Hill, NJ (US); Jennifer M. Buckley, Newark, DE (US); Matthew Reuben Durst, Simsbury, CT (US); Brian Owens, West Simsbury, CT (US); Stephen James Weathers, Media, PA (US); Daniel Appel Wilkins, Saint Leonard, MD (US)

(73) Assignee: Hercules LLC, Wilmington ( * ) Notice: Subject to any disclaimer, the term of this patent is extended or adjusted under 35 U.S.C. 154(b) by 1722 days.

(21) Appl. No.: 13/710,086

(22) Filed: Dec. 10, 2012

(65) Prior Publication Data

US 2014/0163905 A1    Jun. 12, 2014

(51) Int. Cl.
*G01L 9/00* (2006.01)
*G06F 19/00* (2018.01)
(Continued)

(52) U.S. Cl.
CPC .............. *G06F 19/00* (2013.01); *G01L 25/00* (2013.01); *G01L 5/16* (2013.01)

(58) Field of Classification Search
CPC ........................................................ G01L 9/00
(Continued)

(56) References Cited

U.S. PATENT DOCUMENTS

| | | | |
|---|---|---|---|
| 6,520,004 B1 * | 2/2003 | Lin | G01N 3/46 73/7 |
| 7,275,423 B2 * | 10/2007 | Hicks | G01N 19/02 73/104 |

(Continued)

FOREIGN PATENT DOCUMENTS

FR    2270571    12/1975

OTHER PUBLICATIONS

International Search Report, Aug. 21, 2013, PCT/2013/021363, p. 2.
(Continued)

*Primary Examiner* — Gregory J Toatley, Jr.
(74) *Attorney, Agent, or Firm* — Dunlap Codding, P.C.; Shaorong Chen

(57) ABSTRACT

A product testing assembly is described. The product testing assembly may include a substrate, at least one measuring device, and at least one data processing system. The substrate has at least one surface configured to receive an application of a product to be tested. The at least one measuring device is configured to sense measured quantities as product is applied to the substrate and output one or more signals representative of a sequence of forces and/or moments being applied to the surface of the substrate by the application of the product to be tested. The at least one data processing system has one or more processors configured to receive the one or more signals representative of the sequence of forces and/or moments being applied to the surface of the substrate, and to convert the one or more signals into an output signal representative of one or more application performance characteristics of the product to be tested.

17 Claims, 4 Drawing Sheets

(51) Int. Cl.
*G01L 25/00* (2006.01)
*G01L 5/16* (2006.01)

(58) Field of Classification Search
USPC ............... 702/19, 20, 41, 179, 182, 183;
514/21.91; 530/300; 600/309; 73/7, 104
See application file for complete search history.

(56) References Cited

U.S. PATENT DOCUMENTS

| | | | | |
|---|---|---|---|---|
| 7,557,367 | B2* | 7/2009 | Rogers | B82Y 10/00 257/40 |
| 7,786,086 | B2* | 8/2010 | Reches et al. | 530/300 |
| 8,501,697 | B2* | 8/2013 | Gazit et al. | 514/21.91 |
| 2006/0079740 | A1* | 4/2006 | Silver et al. | 600/309 |
| 2008/0154179 | A1* | 6/2008 | Cantor | A61M 37/00 604/20 |
| 2009/0213361 | A1* | 8/2009 | Vander Rhodes | G01J 3/02 356/51 |

OTHER PUBLICATIONS

Sward, G. G., Paint Testing Manual (13th Ed.), Jun. 30, 1972, American Society for Testing and Materials, Philadelphia, pp. 202-206.
Williamson, R.V.V., Petterson, G.D., Hunt, James K, Estimation of Brushing and Flowing Properties of Paints and Plasticity Data, Industrial and Engineering Chemistry, vol. 21, No. 11, Nov. 30, 1929, pp. 1111-1115.
AMTI Six-axis Biomechanics Products, Force Plates and Treadmills for Fait, Balance, and Sports Performance Analysis, http://www.amti.biz/fps-overview.aspx, Mar. 4, 2013.
AMTI Six-axis Force Sensors, Multi-axis Load Cells for Aerospace, Automotive, Biomechanics, Underwater, Robotics + more, http://www.amti.biz/fss-overview.aspx, Dec. 3, 2012.
Choosing a Force Plate, http://www.amti.biz/fps-guide.aspx, Mar. 4, 2013.
Choosing an AMTI Force Sensor, http://www.amti.biz/fss-guide.aspx, Mar. 4, 2013.
Knapp, Danielle, Differential Ability of Selected Postural-Control Measures, Journal of Athletic Training, 2011:46(3):257-262.
Divinycell H35 The World's Lightest Structural Core, http://www.omnexus.com/news.aspx?id=21402, Dec. 2, 2008.
Force Plate Layout Examples, Applications Gait, Neurosciences, Aging, Sports Performance, http://www.amti.biz/fps-layout.aspx, Mar. 4, 2013.
Fundamentals of Fiberglass, Fibre Glast, http://www.fibreglast.com/product/the-fundamentals-of-fiberglass, Mar. 4, 2013.
Hall Effect and Strain Gage Sensor Technology for Multi-axis Force Plates and Force Sensors, http://www.amti.biz/fps-sensor-tech.aspx, Mar. 4, 2013.
Force Plate Mounting Options, http://www.amti.biz/fps-mounting.aspx, Mar. 4, 2013.
Optima Human Performance System, http://www.amti.biz/optima.aspx, Mar. 4, 2013.
Product Record for AccuSway Force Plate, http://www.amti.biz/AMTIpibrowser.aspx, Mar. 4, 2013.
West System 105 Epoxy Resin/206 Slow Hardener, http://www.westsystem.com/ss/assets/Product-Data-PDFs/105206-Technical, Feb. 7, 2012.

* cited by examiner

DEVICE FOR SENSORIAL EVALUATION OF CONSUMER PRODUCT APPLICATION FEEL

BACKGROUND

An important part of consumer product satisfaction is the product application feel. Application feel evaluations are customarily carried out by test panels consisting of either volunteers or trained evaluators. After applying a consumer product, the participants may be given a questionnaire to answer questions such as 'Ease of Application', 'Ease of Spreading', 'Degree of stickiness' and the like depending on the type of the consumer product. Thus, conventional application feel evaluations are subjectively determined based upon the participants testing and answering various questions related to the product meeting required application characteristics.

While the conventional application feel evaluations provide valuable information as to the product meeting the required application performance characteristics of the consumer product, the conventional subjective determinations generally fall short at generating actionable data that can be used in product development and improvement.

SUMMARY

The inventive concepts disclosed herein relate to a product testing assembly that allows collection of real time physical data during a sensorial evaluation of product application feel. Products to be tested may include paint, construction materials, such as a skim coat, joint compound or the like; cosmetics/medicinal creams or ointments; hair treatments such as shampoo, conditioner, sculpting creams or the like.

In one embodiment, the product testing assembly is provided with a panel or mounting plate to which a substrate may be removably attached, at least one measuring device, and at least one data processing system. The substrate has at least one surface configured to receive an application of a product to be tested. In one embodiment, the substrate may be paper, or drywall, and the panel or mounting plate may be plywood or a mesh infused with an epoxy material.

The at least one measuring device is configured to sense measured quantities as product is applied to the substrate. For example, the least one measuring device can be rigidly coupled to the substrate by way of the panel in order for forces and moments applied to the substrate to be transferred to the at least one measuring device. The at least one measuring device outputs one or more signals representative of a sequence of forces and/or moments being applied to the surface of the substrate by the application of the product to be tested.

The at least one data processing system has one or more processors configured to receive the one or more signals representative of the sequence of forces and/or moments being applied to the surface of the substrate. The at least one data processing system converts or translates the one or more signals into an output signal representative of one or more application performance characteristics of the product be tested.

In one embodiment, the product testing assembly is further provided with at least one output device receiving the output signal and rendering the output signal into a format perceivable by a human. Suitable formats may include audio and/or visual formats.

In one embodiment, the at least one measuring device is implemented as a force plate having one or more force transducers. As an evaluator conducts the application test by applying the product to at least one surface of the substrate, the force plate concurrently measures/calculates data, such as the forces, moments and the coordinates of the points of application on the substrate and transmits such data as signals indicative of the forces, moments and the coordinates of the points of application to the at least one data processing system.

This data may offer a detailed quantitative understanding of the product's application feel which helps to understand the reasons behind given subjective sensorial assessment, and may be an invaluable tool in product performance design. For example, a product meeting expectations can be applied to the at least one surface of the substrate and tested with the product testing assembly. Whether or not the product meets expectations can be determined subjectively by utilizing test participants who apply the product and then fill out a questionnaire answering questions such as 'Ease of Application', 'Ease of Spreading', 'Degree of stickiness' and the like depending on the type of the consumer product. Thereafter, the data collected/calculated by the product testing assembly when testing the product meeting expectations can be stored and compared to data collected/calculated by the product testing assembly when testing a product with unknown application performance characteristics. The comparison can be used to convert or translate the one or more signals and/or data collected/calculated by the product testing assembly into the output signal representative of one or more application performance characteristics of the product be tested.

The product testing assembly can be utilized for testing a variety of different types of application performance characteristics including a number of cycles of application, a duration of each cycle, an average duration of the cycles of application of the product to the surface of the substrate, a quantity of work (in joules) to apply the product to the substrate, a speed of application, average velocity of application, acceleration during application, average forces, a range of forces between a minimum force and a maximum force, and weight of product applied to the substrate.

BRIEF DESCRIPTION OF THE SEVERAL VIEWS OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION

Figure 1:
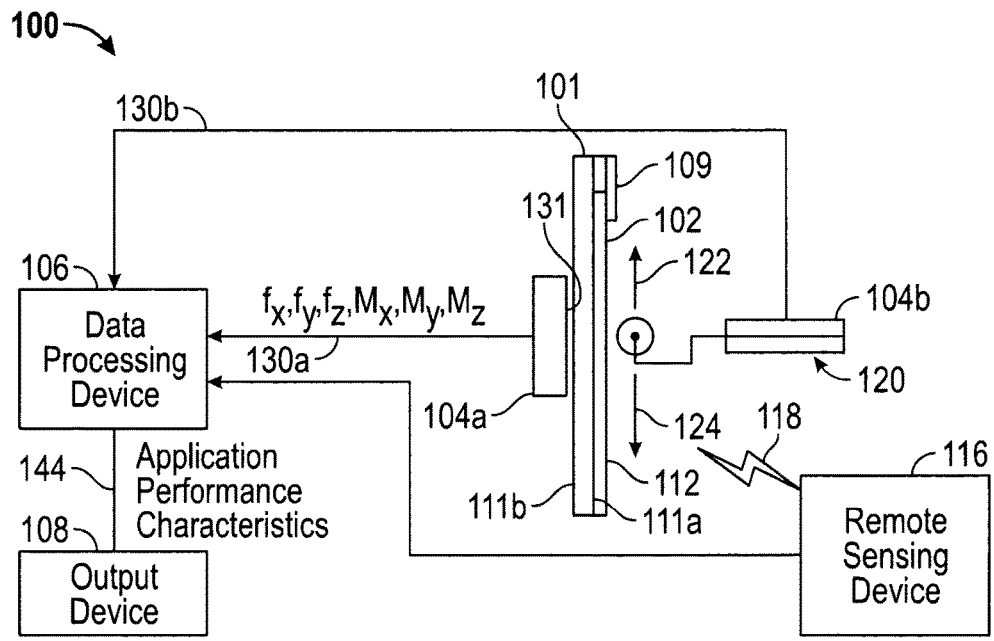
FIG. 1 is a schematic diagram of an exemplary embodiment of a product testing assembly according to the instant disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

The inventive concepts disclosed herein are generally directed to a method and system for testing products, and more particularly, but not by way of limitation to a product testing assembly for sensing measured quantities of a product having unknown application performance characteristics as the product is applied to a substrate and converting the measured quantities into an output signal representative of one or more application performance characteristics of the product to be tested. Thus, the product testing assembly may provide a quantitative analysis with respect to how the product may subjectively feel to users applying the product. The product testing assembly will be described hereinafter in the context of testing a consumer product known as "paint," but it is to be understood that the instant inventive concepts are equally applicable to other types of products including consumer products, industrial products, or the like, as will be understood by a person of ordinary skill in the art presented with the instant disclosure.

As used herein, the terms "network-based," "cloud-based," and any variations thereof, are intended to cover the provision of configurable computational resources on demand via interfacing with a computer network, with software and/or data at least partially located on the computer network, by pooling the processing power of two or more networked processors.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

It is to be further understood that as used herein the term "user" or "evaluator" and variations thereof is not limited to a human being, and may comprise a robot or electromechanical device configured to apply a product to at least a portion of the product testing assembly.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to FIG. 1, shown therein is an exemplary embodiment of a product testing assembly 100 according to the instant disclosure. The product testing assembly 100 may be provided with a panel or mounting plate 101 (hereinafter mounting plate 101), substrate 102 removably attached to the mounting plate 101, at least one measuring device 104 (two measuring devices are shown in FIG. 1, by way of example and are labeled with the reference numerals 104a and 104b), at least one data processing system 106 configured to interface with the at least one measuring device 104 to calculate one or more application performance characteristics of a product to be tested, and at least one output device 108 configured to receive one or more output signal from the data processing system 106 and to render the output signal in a format perceivable by a human (e.g. in audio or visual form). The measuring devices 104a and 104b may be similar in operation and will be generally referred to herein as the at least one measuring device 104. However, it should be understood that in one embodiment the measuring device 104b can be omitted, and in another embodiment the measuring device 104a can be omitted. The measuring devices 104a and 104b may operate independently or together to sense the measured data described herein.

The mounting plate 101 supports the substrate 102 with one or more clamps 109 mounted to and supported by the mounting plate 101. In one embodiment, the mounting plate 101 has a first surface 111a and a second surface 111b with the first surface 111a opposing the second surface 111b. In this embodiment, the one or more clamps 109 bear against the first surface 111a in order to attach the substrate 102 to the mounting plate 101. Further, in the embodiment shown, the measuring device 104 may be connected to the second surface 111b.

The substrate 102 has a least one surface 112 configured to receive an application of a product to be tested. In general, the substrate 102 will be matched with a particular type of product to receive and adhere to the particular type of product to be tested. However, it should be understood that the substrate 102 can be provided in a variety of different manners. For example, if the product to be tested is a construction product such as paint or joint compound, then the substrate 102 can be made of paper, plywood, drywall or a similar product that is normally coated with the paint or joint compound. As another example, instead of the surface 112 being a flat, i.e., two-dimensional surface, the surface 112 can be three-dimensional and provided in a variety of geometric and/or fanciful shapes. For example, if the product to be tested is hair conditioner, then the substrate 102 can be provided as a wig mounted onto a mannequin's head. In this case, the wig would have multiple three-dimensional surfaces 112 in the form of a covering of hair or something resembling hair. As yet another example, the surface 112 can be positioned in orientations having a horizontal orientation, or a tilted orientation having horizontal and vertical components. For example, the surface 112 may extend horizontally to resemble a floor. The horizontal orientation of the surface 112 can be used for testing construction products, such as adhesive for adhering carpet or tile to a floor. In another embodiment, the mounting plate 101 could be designed to support an actual test subject rather than supporting the substrate 102. For example, the mounting plate 101 could be in the form of a chair to receive and support a human test subject during application of a product, such as a hair care product, cosmetic product, cleaning product or the like.

The at least one measuring device 104 is configured to sense measured quantities as product is applied to the substrate 102 and output one or more signals representative of a sequence of forces and/or moments being applied to the surface 112 of the substrate 102 (or a test subject as described above) by the application of the product to be tested. For example, as shown in FIG. 1, an applicator 120, such as a roller is being used by an evaluator to apply paint to the surface 112 of the substrate 102. In the example shown, the applicator 120 is being moved in a periodic fashion generally upwardly (as indicated by an arrow 122) and downwardly (as indicated by arrow 124). As the applicator 120 moves across the surface 112 of the substrate 102 to apply the paint, the at least one measuring device 104 measures, in real time, a suitable number of forces, moments, and may optionally record sounds so as to determine a sensorial evaluation of application feel. For example, in one embodiment the measuring device 104a and/or 104b measures three forces ($F_x$, $F_y$, and $F_z$), three moments ($M_x$, $M_y$, and $M_z$) and the sound of application on a periodic basis such as 50 measurements per second. The sound of application is sound produced by the product as the product is being applied due to the movement of the applicator 120 relative to the surface 112 and the deformation of the product. Although the applicator 120 is shown in FIG. 1 as a roller, it should be understood that the applicator 120 can take many different forms such as a comb, brush, trowel, sponge, wash cloth, loofah, or the like.

The at least one measuring devices 104a and/or 104b may be coupled to the data processing system 106 via signal paths 130a and/or 130b which may be a wired or wireless communication link. As the measuring devices 104a and/or 104b measures the forces, moments and record sounds, a series of sequential data including a timestamp, three forces ($F_x$, $F_y$, and $F_z$), three moments ($M_x$, $M_y$, and $M_z$), and audio data is transmitted from the measuring device 104a and/or 104b to the data processing system 106. By way of example, an exemplary sequence of eight readings of data is shown below in Table I.

TABLE I

| Time (s) | Fx (N) | Fy (N) | Fz (N) | Mx (Nm) | My (Nm) | Mz (Nm) |
|---|---|---|---|---|---|---|
| 2.86 | −0.32 | 0.06 | 1.02 | 0.03 | −0.32 | 0.15 |
| 2.88 | −0.36 | 0.20 | 1.49 | 0.04 | −0.46 | 0.19 |
| 2.9 | −0.40 | 0.37 | 2.05 | 0.05 | −0.63 | 0.23 |
| 2.92 | −0.46 | 0.57 | 2.70 | 0.07 | −0.83 | 0.29 |
| 2.94 | −0.52 | 0.82 | 3.41 | 0.09 | −1.05 | 0.35 |
| 2.96 | −0.59 | 1.10 | 4.18 | 0.12 | −1.28 | 0.43 |
| 2.98 | −0.68 | 1.41 | 4.97 | 0.16 | −1.52 | 0.52 |
| 3.00 | −0.79 | 1.74 | 5.77 | 0.21 | −1.76 | 0.61 |

The measuring device 104a may be a device known in the art as a force plate designed to measure the three-dimensional (or more than three dimensional) components of a single equivalent force applied to a surface 131 of the measuring device 104a as well as the force's point of application, which may be referred to herein as a centre of pressure, as well as moments of force, and optionally sound of application. The measuring device 104a can be implemented in a variety of manners such as by using one or more strain gauge, microphone, piezoelectric sensors, capacitance gauge, piezoresistive, or the like.

The measuring device 104b may be a component of the applicator 120 configured to measure/calculate three or more dimensions of a force, moments applied to the substrate 102 and/or the test subject, and/or sound of application in a variety of manners such as by using one or more strain gauge, microphone, piezoelectric sensors, capacitance gauge, piezoresistive, or the like. For example, as shown in FIG. 1, the measuring device 104b is configured in the form of a handle of the applicator 120. The three-dimensional coordinates of application can be measured by monitoring the location of the applicator 120. This can be accomplished by attaching one or more sensors configured to measure movement in three-dimensions to the applicator 120. Suitable types of sensors include accelerometers and/or gyrometers. Alternatively, the real-time location of the applicator 120 can be determined with a remote sensing device 116 using a transmitter projecting a remote sensing medium 118 to interact with the applicator 120 and a detector assembly to receive and interpret the remote sensing medium to determine the location of the applicator 120. Exemplary remote sensing mediums 118 include light in the visible and non-visible spectrums, as well as sonar. Exemplary remote sensing devices 116 that may be used are known as natural interaction sensors and are sold by various providers, such as Microsoft® under the tradename Xbox® Kinect®.

In general, the data processing system 106 has a processor 132 configured to receive the one or more signals via the signal path 130 representative of the timestamps, sequence of forces and/or moments being applied to the surface 112 of the substrate 102 and to convert the one or more signals into an output signal representative of one or more application performance characteristics of the product to be tested.

Figure 2:
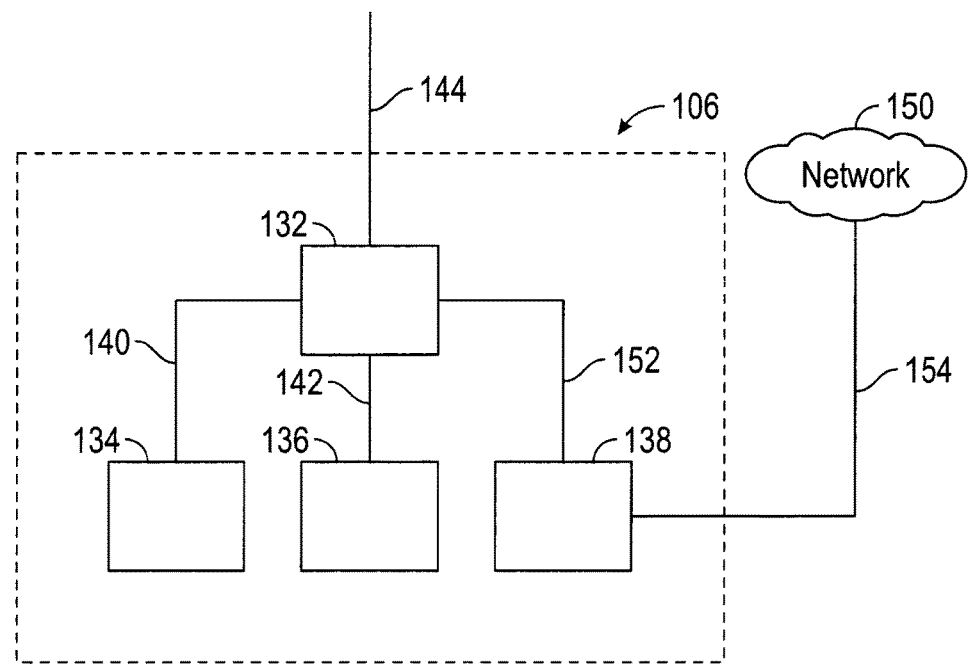
FIG. 2 is a schematic diagram of an exemplary embodiment of a data processing system according to the instant disclosure.

As shown in FIG. 2, the data processing system 106 has the processor 132 which is configured to execute processor executable code, one or more memory 134 capable of storing processor executable code, an input device 136, and a network interface 138. The data processing system 106 can be partially or completely network-based or cloud-based, and is not necessarily located in a single physical location.

The processor 132 can be implemented as a single or multiple processors working together to execute the logic described herein. Exemplary embodiments of the processor 132 include a digital signal processor (DSP), a central processing unit (CPU), a field programmable gate array (FPGA), a microprocessor, a multi-core processor, and combinations thereof. The processor 132 is capable of communicating with the one or more memories 134 via a path 140 which can be implemented as a data bus, for example. The processor 132 is capable of communicating with the input device 136 and the output device 108 via paths 142 and 144, respectively. Paths 142 and 144 may be implemented similarly to, or differently from, path 140. The processor 132 may be further capable of interfacing and/or communicating with one or more user terminals (not shown) via a network 150 via the network interface 138 and paths 152 and 154, such as by exchanging electronic, digital and/or optical signals via one or more physical or virtual ports using a network protocol such as TCP/IP, for example. It is to be understood that in certain embodiments when the processor 132 includes more than one processor, such processors may be located remotely from one another, located in the same location, or comprising a unitary multi-core processor (not shown). The processor 132 is capable of reading and/or executing processor executable code and/or of creating, manipulating, altering, and storing computer data structures into the one or more memory 134.

The one or more memory 134 stores processor executable code and may be implemented as non-transient memory, such as random access memory (RAM), a CD-ROM, a hard drive, a solid state drive, a flash drive, a memory card, a DVD-ROM, a floppy disk, an optical drive, and combinations thereof, for example. It is to be understood that while one or more memory 134 is shown located in the same physical location as the data processing system 106, the one or more memory 134 may be located remotely from the data processing system 106 and may communicate with the processor 132 via the network 150. Additionally, when more than one memory 134 is used, one or more memory 134*a* may be located in the same physical location as the data processing system 106, and one or more memory 134*b* may be located in a remote physical location from the data processing system 106. The physical location(s) of the one or more memory 134 can be varied, and the one or more memory 134 may be implemented as a "cloud memory" i.e., one or more memory 134 which is partially, or completely based on, or accessed using the network 150.

The input device 136 transmits data to the processor 132, and can be implemented as a keyboard, a mouse, a touchscreen, a camera, a cellular phone, a tablet, a smart phone, a PDA, a microphone, a network adapter, and combinations thereof, for example. The input device 136 may be located in the same physical location as the data processing system 106, or may be remotely located and/or partially or completely network-based. The input device 136 communicates with the processor 132 via the path 142 which, as discussed above may be a data bus.

The output device 108 transmits information from the processor 132 to a user, such that the information can be perceived by the user. For example, the output device 108 can be implemented as a server, a computer monitor, a cell phone, a tablet, a speaker, a website, a PDA, a fax, a printer, a projector, a laptop monitor, and combinations thereof. The output device 108 can be physically co-located with the data processing system 106, or can be located remotely from the data processing system 106, and may be partially or completely network based (e.g., a website hosted by one or more servers and accessible via the Internet using HTML, XHTML, secure HTML and/or TCP/IP, for example). The output device 108 communicates with the processor 132 via the path 144.

The network 150 preferably permits bi-directional communication of information and/or data between the data processing system and one or more user terminals and/or other devices (not shown). The network 150 may interface with the data processing system 106 in a variety of ways, such as by optical and/or electronic interfaces, and may use a plurality of network topographies and protocols, such as Ethernet, TC/IP, circuit switched paths, and combinations thereof, for example. For example, the network 150 can be implemented as the World Wide Web (or Internet), a local area network (LAN), a wide area network (WAN), a metropolitan network, a wireless network, a cellular network, a GSM-network, a CDMA network, a 3G network, a 4G network, a satellite network, a radio network, an optical network, a cable network, a public switched telephone network, an Ethernet network, and combinations thereof, and may use a variety of network protocols to permit bi-directional interface and communication of data and/or information between the processor 132 and the network 150.

Figure 3:
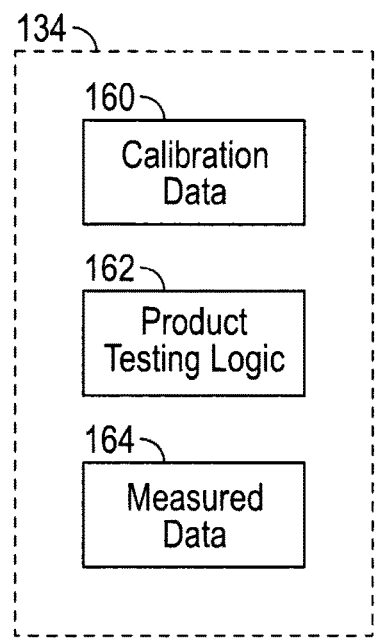
FIG. 3 is a block diagram of an exemplary embodiment of a memory according to the instant disclosure.

Referring now to FIG. 3, the one or more memory 134 preferably stores processor executable code and/or information comprising calibration data 160, product testing logic 162, and measured data 164. The processor executable code may be written in any suitable programming language, such as C++, for example. The calibration data 160 and measured data 164 can be stored as a data structure, such as a relational database and/or one or more data table(s), for example.

The calibration data 160 preferably comprises information, such as a timestamp, three forces ($F_x$, $F_y$, and $F_z$) and three moments ($M_x$, $M_y$, and $M_z$) collected by the measuring device 104 during the application of one or more products which met or exceeded subjectively determined expectations related to the way the application of the product felt to the user as the product was applied to the surface 112 of the substrate 102. Further, the calibration data 160 may also include data calculated from (or derived from) the information collected by the measuring device 104. For example, the calibration data may include an identification of sequential coordinates (e.g. X, Y and Z) of the center of forces of the points of application of the product on the surface 112 of the substrate 102. The coordinates can be calculated as follows: $X=M_y/F_z$; $Y=M_x/F_z$; and $Z=M_x/F_y$, or $Z=M_y/F_x$. Knowing the sequence of coordinates permits the data processing system 106 to track the location, speed and acceleration of application, and/or the direction of application of the product onto the surface 112 of the substrate 102.

The calibration data 160 may be characterized as a library including information for more than one type of product arranged by the type of product. For example, the calibration data 160 may include first information collected for a first type of product such as paint, and second information, collected for a second type of product such as a skim coat.

The measured data 164 preferably comprises information, such as a timestamp, three forces ($F_x$, $F_y$, and $F_z$) and three moments ($M_x$, $M_y$, and $M_z$) collected by the measuring device 104 during the application of one or more products for which the product application feel is to be measured during and/or after application of the product to the surface 112 of the substrate 102. Further, the measured data 164 may also include data calculated from (or derived from) the information collected by the measuring device 104. For example, the measured data 164 may include an identification of sequential coordinates (e.g. X, Y and Z) of the center of forces of the points of application of the product on the surface 112 of the substrate 102. The coordinates can be calculated in a similar manner as described above with respect to the calibration data 160. Knowing the sequence of coordinates permits the data processing system 106 to track the location, speed and acceleration of application, and/or the direction of application of the product onto the surface 112 of the substrate 102.

The product testing logic 162 is adapted to cause the processor 132 to receive the sequence of measured data 164 while the product is being applied to the surface 112 of the substrate 102 and store the measured data 164 onto the memory 134. The product testing logic 162 may be configured to cause the processor 132 to calculate one or more data indicative of the sensorial evaluation of application feel which is referred to herein as an application performance characteristic. Exemplary data that is calculated by the processor 132 using the product testing logic 162 may include speed of application (a detection of movement of force applied to the substrate 102 between a first location and a second location during a duration of time), the average and the peak normal forces, and the total work of the application. Once one or more of the application performance characteristics are calculated for the measured data 164, the application performance characteristics of the measured data 164 are compared to application performance characteristics of the calibration data 160 in order to provide a quantitative measurement of application feel.

Figure 4:
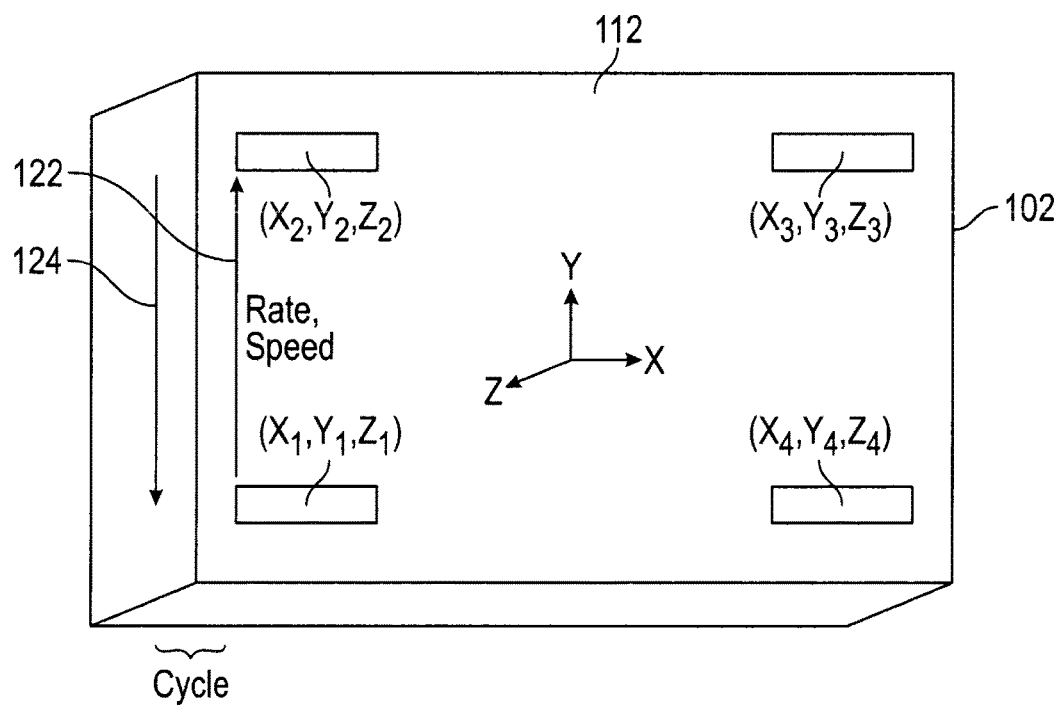
FIG. 4 is a diagrammatic view illustrating the use of a substrate of the product testing assembly by an evaluator according to the instant disclosure.

It should be understood that a variety of different types of application performance characteristics can be calculated by the processor 132 executing the product testing logic 162. For example, referring now to FIG. 4, shown therein is a perspective view of the substrate 102 having the surface 112. In the example depicted in FIG. 4, the substrate 102 can be provided with a substantially rectangular shape having a first corner identified by the coordinates $X_1$, $Y_1$, $Z_1$; a second corner identified by the coordinates $X_2$, $Y_2$, $Z_2$; a third corner identified by the coordinates $X_3$, $Y_3$, $Z_3$; and a fourth corner identified by the coordinates $X_4$, $Y_4$, $Z_4$. The data processing system 106 can calculate the centre of position of the applicator 120 as the applicator 120 applies the product to the surface 112. When certain products are applied with a roller, such as paint, the applicator 120 is moved in a periodic fashion through one or more cycles in which the applicator 120 is moved in the direction 122 from the first corner toward the second corner; and in the direction 124 from the second corner toward the first corner, for example.

The application performance characteristics calculated by the data processing system 106 may include a number of cycles, a duration of each cycle, an average duration of the cycles of application of the product to the surface of the substrate, average force per cycle in at least one dimension (e.g., X, Y and/or Z), minimum force range per cycle in at least one dimension (e.g., X, Y and/or Z), and maximum force range per cycle in at least one dimension (e.g., X, Y and/or Z). The data processing system 106 may be configured to detect within the signals a periodic application of the product having one or more cycles as represented by sequential changes in location of force applied to the substrate 102, and to calculate at least one application performance characteristic selected from the group consisting of the number of cycles, a duration of each cycle, an average duration of the cycles, average force per cycle in at least one dimension (e.g., X, Y and/or Z), minimum force range per cycle in at least one dimension (e.g., X, Y and/or Z), and maximum force range per cycle in at least one dimension (e.g., X, Y and/or Z).

The application performance characteristics may also include a total amount of product applied to the surface 112, an average rate of product applied to the surface 112. The product testing logic 162 may be configured to cause the processor 132 of the data processing system 106 to calculate at least one of a total amount of product applied to the surface 112, and an average rate of product applied to the surface 112 based on a detection of a time period of application of force in a direction normal to the surface, and a residual force applied to the surface 112 following application of the product.

Figure 5:
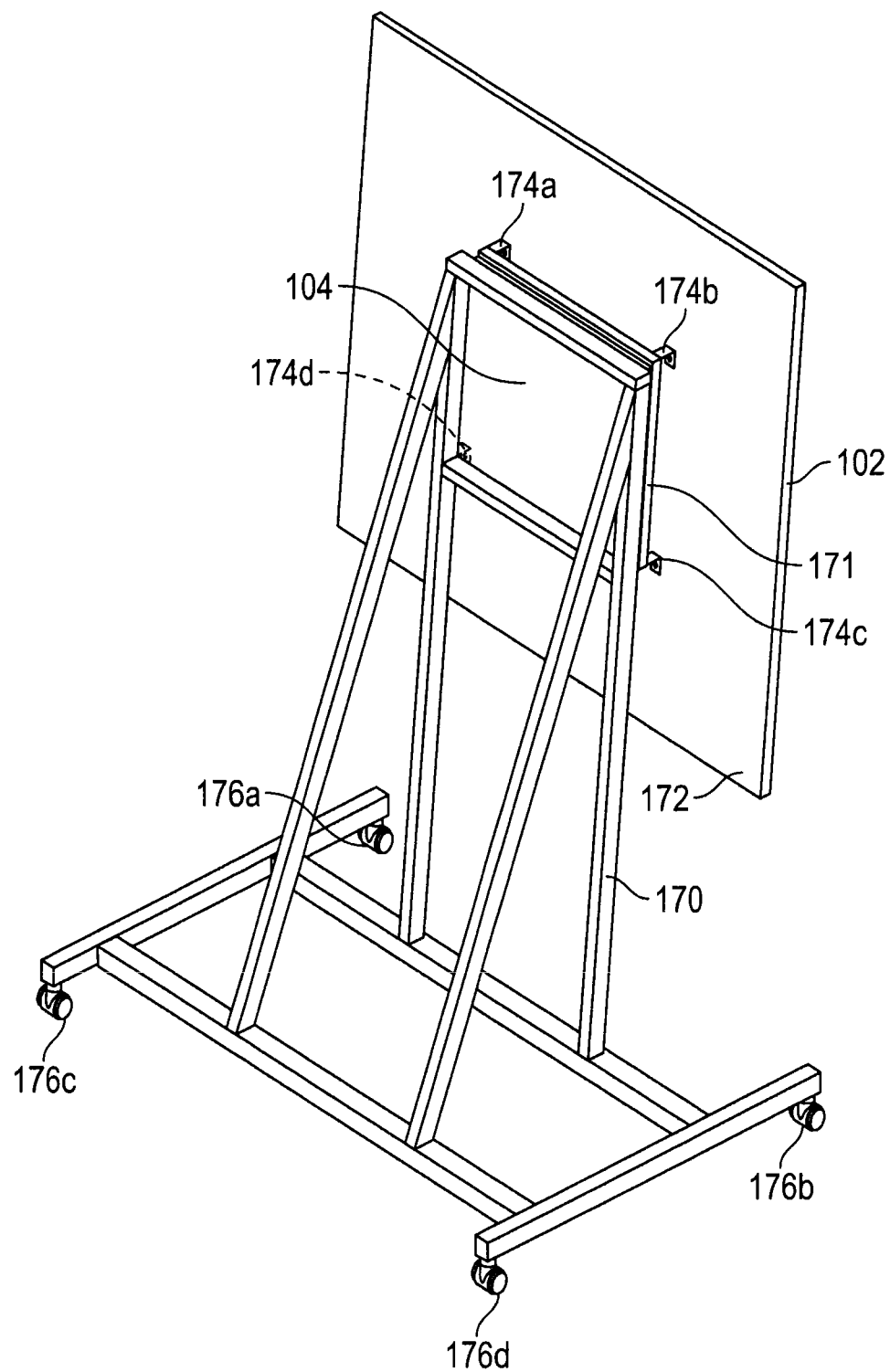
FIG. 5 is a perspective view of an exemplary embodiment of the product testing assembly according to the instant disclosure.

Referring now to FIG. 5, shown therein is an exemplary embodiment of a stand 170 supporting the measuring device 104 and the substrate 102. In this example, the measuring device 104 has a mounting surface 171 rigidly attached to a panel 172 via a plurality of connection points 174a, 174b, 174c and 174d. The mounting surface 171 may have a substantially vertical orientation, as shown in FIG. 5. In addition, in this example, the substrate 102 is removably connected to the panel 172 to which the measuring device 104 is connected such that the at least one measuring device 104 supports the entire weight of the panel 172 and the substrate 102. The panel 172 may have any suitable dimensions, such as 4'×4', and is configured to accept any suitable substrate 102, such as either paper charts or dry wall. In one embodiment, the panel 172 may be made of a lamination formed by (1) a core; (2) coated with an epoxy; and (3) one or more outer layers. A suitable core may be a foam core, such as that sold under the tradename Divinycell H35 Foam Core. A suitable epoxy can be made from a two part component sold under the names WEST 105 Epoxy and WEST 206 Hardener in a 5:1 ratio, respectively. The outer layers may include one or more sheets of twill weave carbon fiber having a 3 k weight and having 3 layers.

The substrate 102 can be removably connected to the panel using any suitable mechanical or electrical assembly such as clips, clamps or electromagnets. The stand 170 can be a portable stand having a plurality of wheels 176a, 176b, 176c and 176d, for example, or a fixed stand such as a wall.

Figure 6:
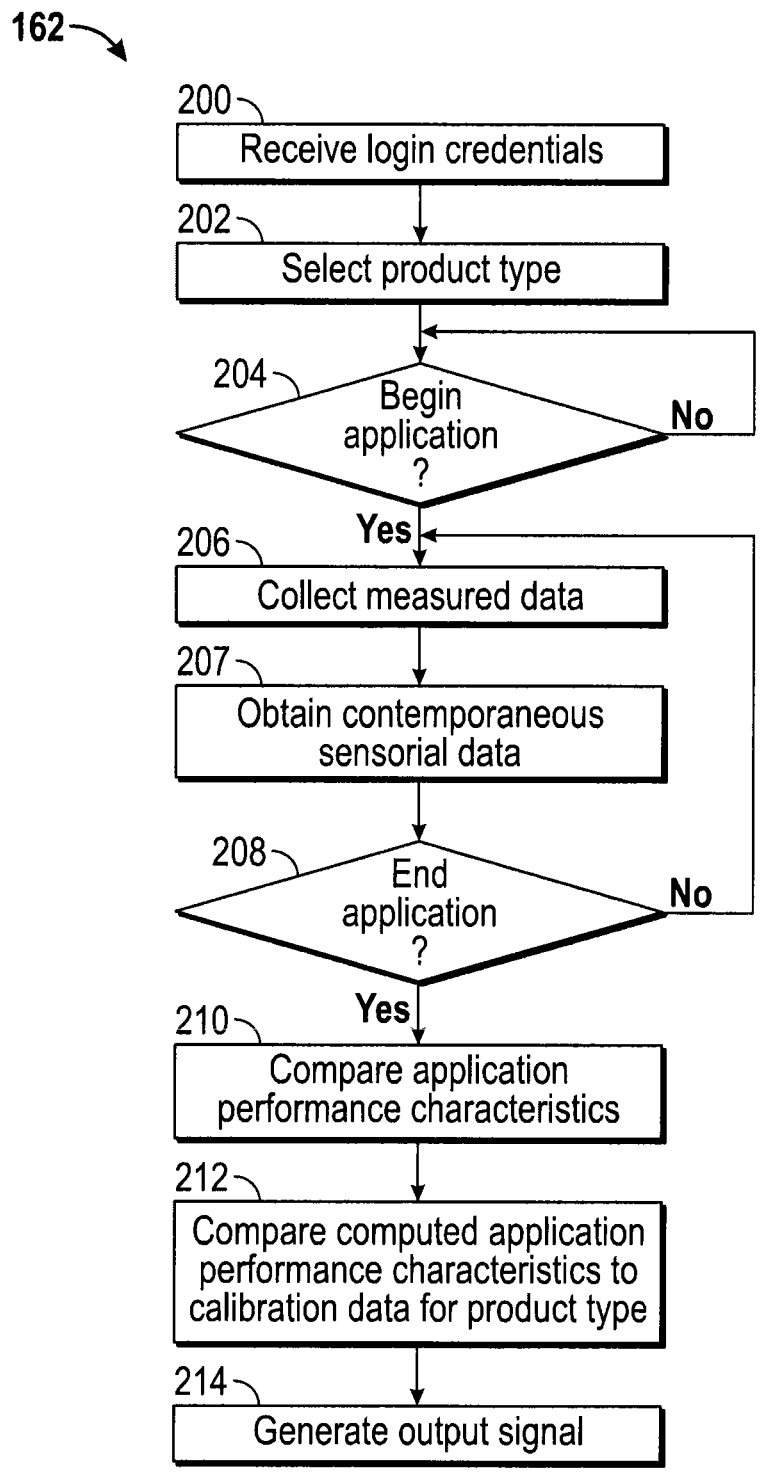
FIG. 6 is a logic flow diagram of an exemplary product testing logic according to the instant disclosure.

Shown in FIG. 6 is a logic flow diagram of an exemplary product testing logic 162 according to the instant disclosure. In general, the product testing logic 162 may include logic for receiving and authenticating login credentials from a user as indicated by a block 200. Various types of login credentials can be received and authenticated such as a username and password, biometric information of the user including a fingerprint, or a pin number. In any event, once the user is authenticated, the product testing logic 162 branches to a block 202 where a product type screen can be provided to the user to permit the user to select the product type to be tested. As discussed above, a variety of different types of products may be tested such as paint, skim coats, cosmetics, or the like. The product type screen may include a menu to permit selection of a particular type of product to be tested from a listing of predetermined product types in which calibration data 160 has already been received and analyzed.

Once the product type is selected, the product testing logic 162 may branch to a block 204 to receive input from the user with respect to the beginning of the application of the product to the surface 112 of the substrate 102. Once the product testing logic 162 receives input from the user (via the input device 136, for example), the product testing logic 162 branches to a block 206 to collect measured data from the measuring device 104 followed by a block 207 to collect contemporaneous sensorial data from the user using the applicator 120 to apply the product to the substrate 102. The contemporaneous sensorial data may include the user's subjective impressions of the product's application feel. The contemporaneous sensorial data may be time-stamped during the test so that the user's subjective impressions can be related to and synchronized with the measured data. The contemporaneous sensorial data can be collected by presenting questions (or otherwise requesting input) on the output device 108 (e.g., a monitor) and receiving the user's subjective impressions via the input device 136. Periodically during the collection of the measured data 206, the product testing logic 162 may branch to a block 208 to determine whether the application of the product has ended. The ending of the application of the product can be determined in one or more manners. For example, the measured data from the measuring device 104 can be monitored to determine when the measured data is no longer changing for a predetermined period of time. In another example, input indicative of the ending of the application of the product can be received from the user via the input device 136.

If the application of product has not ended, the product testing logic 162 may branch back to the block 206 to continue collecting measured data. However, once the application of the product has ended, the product testing logic 162 may branch to a block 210 where the product testing logic 162 computes one or more application performance characteristics as described above. Then, the product testing logic 162 may branch to a block 212 where the computed application performance characteristics are compared to application performance characteristics computed for products which met expectations as stored within the calibration data 160 for the product type. The product testing logic 162 may then generate an output signal indicative of the sensorial evaluation of application feel as indicated by a block 214. It should be noted that the product testing logic 162 may utilize or include a math analysis program such as that sold under the tradename "Matlab" when computing and/or comparing the application performance characteristics.

Thus, one skilled in the art will recognize that the present disclosure describes methods and systems for quantitatively analyzing the application of a product to the surface 112 of the substrate 102 that is correlated with calibration data 160 indicative of subjective factors of application feel such as ease of application, ease of spreading, degree of stickiness and the like depending on the type of the product.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope and spirit of the inventive concepts disclosed herein and defined by the appended claims.

What is claimed is:

1. A product testing assembly, comprising:
    a panel configured to support at least one of a substrate and a test subject having at least one surface configured to receive an application of a product to be tested; and
    at least one measuring device configured to sense measured quantities as product is applied to the at least one of the substrate and the test subject and output one or more signals representative of a sequence of forces and/or moments being applied to the surface by the application of the product to be tested;
    at least one data processing system having an interface device coupled to the at least one measuring device via a wired or a wireless communication link, and one or more processors configured to receive the one or more signals representative of the sequence of forces and/or moments being applied to the surface via the interface device, and to convert the one or more signals into an output signal representative of one or more quantitative application performance characteristics of the product to be tested; and
    wherein the one or more quantitative application performance characteristics are correlated with calibration data collected during application of one or more calibration products that had been determined by a human to meet or exceed subjectively determined expectations related to the way the application of the calibration product felt to the human as the calibration product was applied.

2. The product testing assembly of claim 1, further comprising at least one output device receiving the output signal and rendering the output signal into a visual format perceivable by a human.

3. The product testing assembly of claim 1, wherein the application performance characteristics are selected from a group including speed and acceleration of application, a number of cycles, a duration of each cycle, distance of each cycle, and an average duration of the cycles of application of the product to the surface, and wherein the at least one data processing system is configured to detect within the signals a periodic application of the product having one or more cycle as represented by sequential changes in location of force applied to the surface, and to calculate at least one application performance characteristic selected from the group consisting of speed and acceleration of application, the number of cycles, a duration of each cycle, distance of each cycle, and an average duration of the cycles.

4. The product testing assembly of claim 1, wherein the application performance characteristics includes quantity of work, and wherein the at least one data processing system is configured to calculate the quantity of work with the signals based on force applied to the surface and distance covered between a first location and a second location.

5. The product testing assembly of claim 1, wherein the application performance characteristics includes speed and acceleration of application, and wherein the at least one data processing system is configured to calculate the speed and acceleration of application with the signals based on a detection of movement of force applied to the surface between a first location and a second location during a duration of time.

6. The product testing assembly of claim 1, wherein the application performance characteristics include a total amount of product applied to the surface, an average rate of product applied to the surface, and wherein the at least one data processing system is configured to calculate at least one of a total amount of product applied to the surface, and an average rate of product applied to the surface based on a detection of a time period of application of force in a direction normal to the surface, and a residual force applied to the surface following application of the product.

7. The product testing assembly of claim 1, wherein the application performance characteristics are selected from a group including average force per cycle in at least one dimension, minimum force range per cycle in at least one dimension, and maximum force range per cycle in at least one dimension, and wherein the at least one data processing system is configured to detect within the signals a periodic application of the product having one or more cycle as represented by sequential changes in location of force applied to the surface, and to calculate at least one application performance characteristic selected from the group consisting of average force per cycle in at least one dimension, minimum force range per cycle in at least one dimension, and maximum force range per cycle in at least one dimension.

8. The product testing assembly of claim 1, wherein the measuring device is connected to the panel.

9. The product testing assembly of claim 1, wherein the panel has a first surface and a second surface with the first surface opposing the second surface, and wherein the product testing assembly further comprises one or more clamps bearing on the first surface.

10. The product testing assembly of claim 9, wherein the measuring device is connected to the second surface of the panel.

11. The product testing assembly of claim 1, further comprising an applicator attached to the measuring device, the measuring device configured to sense the measured quantities as the applicator applies the product to the substrate.

12. The product testing assembly of claim 11, further comprising a remote sensing device configured to monitor the real-time coordinates of the applicator in at least three dimensions as the applicator applies the product to the substrate.

13. The product testing assembly of claim 1, wherein the measuring device is configured to record a sound of application as the product is being applied to the surface.

14. The product testing assembly of claim 1, wherein the one or more processors are configured to collect and time-stamp sensorial data from a human during the application of the product to the surface.

15. A method, comprising:
  receiving, by a processor of at least one data processing system, a sequence of data via an interface device coupled to at least one measuring device via a wired or a wireless communication link indicative of measured quantities measured by at least one measuring device of a product testing assembly as a product is applied to a surface of at least one of a substrate and a test subject in the product testing assembly, the measured quantities representative of a sequence of forces and/or moments being applied to the surface by the application of the product; and
  translating, by the processor, the sequence of data indicative of measured quantities into an output signal using calibration data collected during application of one or more calibration products that had been determined by a human to meet or exceed subjectively determined expectations related to the way the application of the calibration product felt to the human as the calibration product was applied, the output signal representative of one or more application performance characteristics of the product being tested.

16. The method of claim 15, wherein the product is selected from a group consisting of a consumer product, and an industrial product.

17. The method of claim 16, wherein the product is paint.

* * * * *